J. A. VAN BORKUM.
EGG TRANSFERRER.
APPLICATION FILED JULY 9, 1917.
1,306,290.
Patented June 10, 1919.
2 SHEETS—SHEET 1.
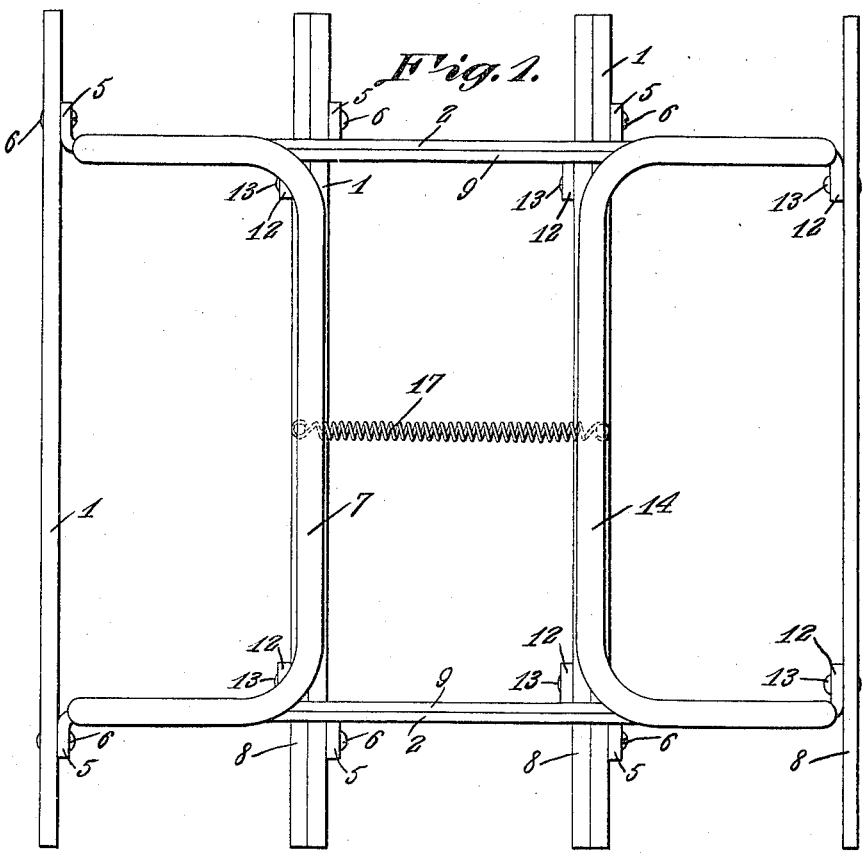
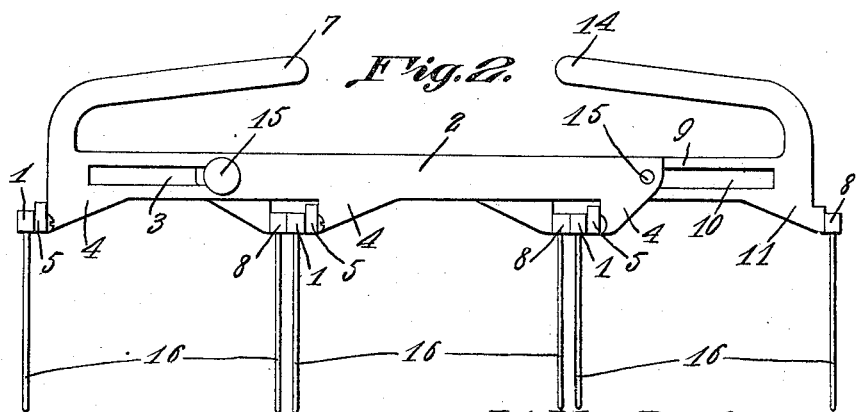
Witnesses
J. A. Van Borkum, Inventor
by C. A. Snow & Co.
Attorneys J. A. VAN BORKUM.
EGG TRANSFERRER.
APPLICATION FILED JULY 9, 1917.
1,306,290.
Patented June 10, 1919.
2 SHEETS—SHEET 2.
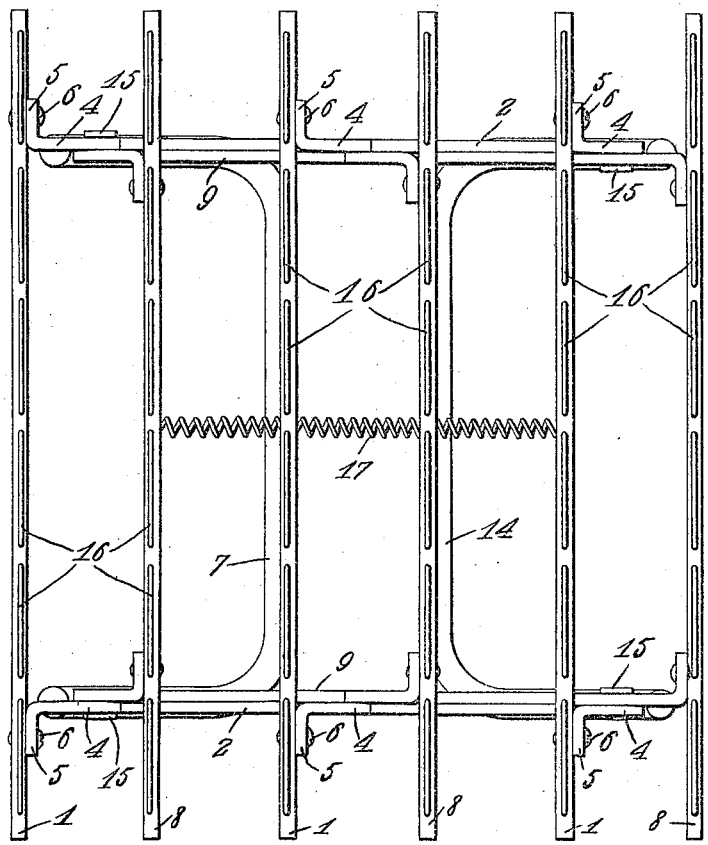
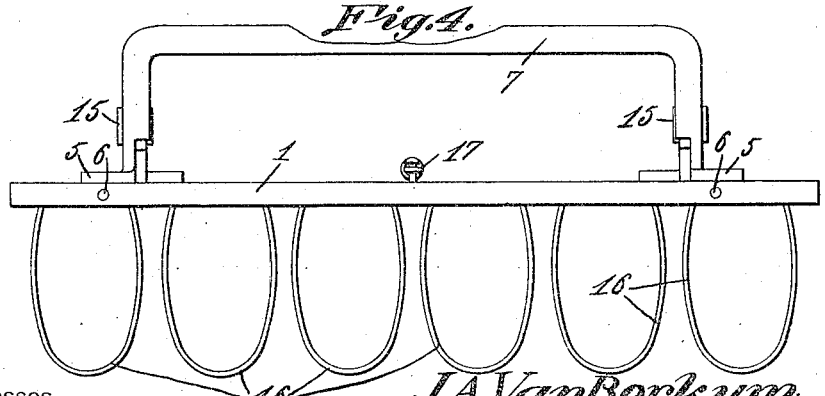

UNITED STATES PATENT OFFICE.

JOHN A. VAN BORKUM, OF BEATRICE, NEBRASKA, ASSIGNOR, BY DIRECT AND MESNE ASSIGNMENTS, OF ONE-THIRD TO RANKIN H. ARMSTRONG, OF BEATRICE, NEBRASKA, AND ONE-SIXTH TO J. W. RICHISON, OF FAIRBURY, NEBRASKA.

EGG-TRANSFERRER.

1,306,290.      Specification of Letters Patent.      Patented June 10, 1919.

Application filed July 9, 1917. Serial No. 179,592.

*To all whom it may concern:*

Be it known that I, JOHN A. VAN BORKUM, a citizen of the United States, residing at Beatrice, in the county of Gage and State of Nebraska, have invented a new and useful Egg-Transferrer, of which the following is a specification.

The subject of this invention is an egg transferrer, intended for use in moving eggs and the like from place to place, and the objects of the invention are, first, to provide a transferrer which will readily grip a number of eggs and automatically release them; second, to provide resilient egg gripping members; third, to provide a sliding frame with suitable handles and depending egg gripping members; fourth, to provide a simple and efficient transferrer.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawings, wherein:

Figure 1 is a plan view of the device.

Fig. 2 is an end elevation.

Fig. 3 is a bottom plan view showing the device in extended position.

Fig. 4 is a side elevation.

Referring to the drawings by numerals of reference: The device consists of two substantially similar frames, the one composed of spaced longitudinal bars 1 connected by transverse members 2. Each transverse member 2 is provided with a slot 3 extending for a short distance longitudinally thereof, and also with depending ears 4 from which extend laterally, the lugs 5. Bars 1 are secured to lugs 5 by screws 6, or otherwise.

Formed, preferably integral with the transverse members 2, is the curved handle 7, which extends between the transverse members and overlies the frame.

The other frame is composed of spaced longitudinal bars 8 which are connected by transverse members 9. Each transverse member 9 is provided with a slot 10, extending for a short distance longitudinally thereof, and also with depending ears 11 from which extend, laterally, the lugs 12. Bars 8 are secured to the lugs 12 by screws 13 or in any other suitable manner.

A handle 14 extends between the transverse members 9, with which it is preferably integral, and overlies the frame.

The frames are arranged in opposed positions with the transverse members 2 of one frame in sliding contact with the transverse members 9 of the other frame, and the intermediate bars 1 and 8 normally contacting the inner bars 8 and 1, respectively, throughout their lengths, as shown.

Headed stubs 15 are riveted, or otherwise secured to the transverse members 2 and 9, and extend through the slots 10 and 3, respectively, for the purpose of holding the members in sliding contact.

Spaced, depending, resilient loops 16 are secured to each bar 1 and 8, and arranged longitudinally thereof. A resilient member, such as the expansion spring 17, connects the two frames and retains them in normal position.

In practice the device is used as follows: The device is lowered upon rows of eggs with the resilient loops 16 extending between the eggs. By gripping the hand about the opposed handles 7 and 14, they are drawn toward each other thereby sliding the frames toward each other and causing the resilient loops 16 to grip opposed sides of the eggs. The device with the eggs therein may then be lifted and the eggs transported to any desired point, where they may be deposited by releasing the grip on the handles, when the spring 17 will draw the frames apart, or to normal position, and release the eggs from the loops.

Having thus described the invention, what is claimed as new and sought by Letters Patent, is:

1. A transferrer including supporting members arranged side by side and in sliding engagement, lugs secured to the members, bars secured to the lugs, gripping elements carried by the bars and depending therefrom, handles rigidly secured to the supporting members for sliding the members to bring the gripping elements into gripping position, and a retractile spring for restoring the parts to normal position.

2. A transferrer including supporting members arranged side by side and having longitudinal slots therein, elements secured to the respective members and extending through the slots to hold the members in sliding engagement; bars secured to and extending transversely of the members, egg gripping elements carried by the bars, opposed handles rigidly secured to the members and adapted to be drawn toward each other to slide the members and bring the gripping elements to egg holding positions, and a resilient member for restoring the members to normal position.

In testimony that I claim the foregoing as my own, I have hereto affixed my signature in the presence of two witnesses.

JOHN A. VAN BORKUM.

Witnesses:
  HENRY JOHNSON,
  RANKIN H. ARMSTRONG.

Copies of this patent may be obtained for five cents each, by addressing the "Commissioner of Patents, Washington, D. C."